United States Patent
Pani et al.

(10) Patent No.: US 7,460,529 B2
(45) Date of Patent: Dec. 2, 2008

(54) INTERCONNECTION FABRIC USING SWITCHING NETWORKS IN HIERARCHY

(75) Inventors: Peter M. Pani, Mountain View, CA (US); Benjamin S. Ting, Saratoga, CA (US)

(73) Assignee: Advantage Logic, Inc., Mountain View, CA (US)

( * ) Notice: Subject to any disclaimer, the term of this patent is extended or adjusted under 35 U.S.C. 154(b) by 922 days.

(21) Appl. No.: 10/909,810

(22) Filed: Jul. 29, 2004

(65) Prior Publication Data

US 2006/0023704 A1   Feb. 2, 2006

(51) Int. Cl.
*H04Q 11/00* (2006.01)
*H03K 19/00* (2006.01)
*H03K 19/173* (2006.01)

(52) U.S. Cl. .................... 370/388; 716/17; 326/39

(58) Field of Classification Search .............. None
See application file for complete search history.

(56) References Cited

U.S. PATENT DOCUMENTS

| | | | |
|---|---|---|---|
| 4,020,469 A | 4/1977 | Manning | |
| 4,661,901 A | 4/1987 | Veneski | |
| 4,700,187 A | 10/1987 | Furtek | |
| 4,720,780 A | 1/1988 | Dolecek | |
| 4,736,333 A | 4/1988 | Mead et al. | |
| 4,758,745 A | 7/1988 | Elgamal | |
| 4,815,003 A | 3/1989 | Putatunda et al. | |
| 4,847,612 A | 7/1989 | Kaplinsky | |
| 4,870,302 A | 9/1989 | Freeman | |
| 4,912,342 A | 3/1990 | Wong et al. | |
| 4,918,440 A | 4/1990 | Furtek | |
| 4,935,734 A | 6/1990 | Austin | |
| 4,992,680 A | 2/1991 | Benedetti et al. | |
| 5,122,685 A | 6/1992 | Chan | |
| 5,144,166 A | 9/1992 | Camarota et al. | |
| 5,187,393 A | 2/1993 | Elgamal et al. | |
| 5,204,556 A | 4/1993 | Shankar | |
| 5,208,491 A | 5/1993 | Ebeling et al. | |
| 5,221,865 A | 6/1993 | Phillips et al. | |
| RE34,363 E | 8/1993 | Freeman | |
| 5,243,238 A | 9/1993 | Kean | |
| 5,256,918 A | 10/1993 | Suzuki | |
| 5,260,610 A | 11/1993 | Pederson et al. | |

(Continued)

FOREIGN PATENT DOCUMENTS

EP   0415542   3/1991

(Continued)

OTHER PUBLICATIONS

International Preliminary Report on Patentability, PCT/US2005/020945 filed Jun. 15, 2005, mailed Feb. 8, 2007.

(Continued)

*Primary Examiner*—Firmin Backer
*Assistant Examiner*—Clemence Han
(74) *Attorney, Agent, or Firm*—Blakely, Sokoloff, Taylor & Zafman LLP

(57) ABSTRACT

An interconnection fabric using switching networks hierarchically to allow interconnections of large number of a first plurality of conductors to a large number of k plurality of conductors is described. The resulting interconnection fabric can be used in switching networks, routers and programmable logic circuits.

24 Claims, 5 Drawing Sheets

U.S. PATENT DOCUMENTS

| | | | |
|---|---|---|---|
| 5,260,611 | A | 11/1993 | Cliff et al. |
| 5,296,759 | A | 3/1994 | Sutherland et al. |
| 5,298,805 | A | 3/1994 | Garverick et al. |
| 5,329,470 | A | 7/1994 | Sample et al. |
| 5,349,691 | A | 9/1994 | Harrison et al. |
| 5,369,314 | A | 11/1994 | Patel et al. |
| 5,376,844 | A | 12/1994 | Pederson et al. |
| 5,396,126 | A | 3/1995 | Britton et al. |
| 5,406,525 | A | 4/1995 | Nicholes |
| 5,444,394 | A | 8/1995 | Watson et al. |
| 5,455,525 | A | 10/1995 | Ho et al. |
| 5,457,410 | A | 10/1995 | Ting |
| 5,469,003 | A | 11/1995 | Kean |
| 5,477,067 | A | 12/1995 | Isomura et al. |
| 5,485,103 | A | 1/1996 | Pederson et al. |
| 5,519,629 | A | 5/1996 | Snider |
| 5,537,057 | A | 7/1996 | Leong et al. |
| 5,550,782 | A | 8/1996 | Cliff et al. |
| 5,552,722 | A | 9/1996 | Kean |
| 5,572,148 | A | 11/1996 | Lytle et al. |
| 5,581,199 | A | 12/1996 | Pierce et al. |
| 5,581,767 | A | 12/1996 | Katuski et al. |
| 5,815,004 | A | 9/1998 | Trimberger et al. |
| 5,818,254 | A | 10/1998 | Agrawal et al. |
| 5,825,202 | A | 10/1998 | Tavana |
| 5,835,405 | A | 11/1998 | Tsui et al. |
| 5,850,564 | A | 12/1998 | Ting et al. |
| 5,880,597 | A | 3/1999 | Lee |
| 5,883,526 | A | 3/1999 | Reddy et al. |
| 5,894,228 | A | 4/1999 | Reddy |
| 5,903,165 | A * | 5/1999 | Jones et al. ............... 326/39 |
| 5,914,616 | A | 6/1999 | Young |
| 6,016,063 | A | 1/2000 | Trimberger |
| 6,034,547 | A * | 3/2000 | Pani et al. ................ 326/41 |
| 6,038,627 | A | 3/2000 | Plants |
| 6,051,991 | A | 4/2000 | Ting |
| 6,088,526 | A * | 7/2000 | Ting et al. ................ 712/33 |
| 6,160,420 | A | 12/2000 | Gamal |
| 6,163,168 | A | 12/2000 | Nguyen et al. |
| 6,181,162 | B1 | 1/2001 | Lytle et al. |
| 6,417,694 | B1 | 7/2002 | Reddy et al. |
| 6,433,580 | B1 | 8/2002 | Ting |
| 6,507,217 | B2 | 1/2003 | Ting |
| 6,594,810 | B1 | 7/2003 | Reblewski et al. |
| 6,597,196 | B2 | 7/2003 | Ting |
| 6,670,825 | B1 | 12/2003 | Lane et al. |
| 6,686,768 | B2 | 2/2004 | Comer |
| 6,693,456 | B2 | 2/2004 | Wong |
| 6,975,139 | B2 * | 12/2005 | Pani et al. ................ 326/41 |
| 2001/0007428 | A1 | 7/2001 | Young |
| 2002/0163357 | A1 | 11/2002 | Ting |
| 2003/0080777 | A1 * | 5/2003 | Baxter ..................... 326/39 |

FOREIGN PATENT DOCUMENTS

| | | |
|---|---|---|
| EP | 0630115 A2 | 6/1994 |
| GB | 2180382 | 3/1987 |
| GB | 2295738 | 5/1996 |
| WO | 9208286 | 5/1992 |
| WO | 9410754 | 5/1994 |
| WO | 9428475 | 12/1994 |
| WO | 9504404 | 2/1995 |
| WO | 9528769 | 10/1995 |
| WO | 9605964 | 4/1996 |
| WO | 9635261 | 11/1996 |
| WO | WO 03/032492 | 4/2003 |

OTHER PUBLICATIONS

Altera Corporation Date Sheet, Flex EPF81188 12,000 Gate Programmable Logic Device, Sep. 1992, Ver. 1, pp. 1-20.

Atmel Field Programmable Arrays, AT 6000 Series, 1993, p. 1-16.

Britton, et al., "Optimized Reconfigurable Cell Array Architecture for High-Performance Field Programmable Gate Arrays," Proceedings of the IEEE 1993 Custom Integrated Circuits Conference, 1993, pp. 7.2.1-7.2.5.

Buffoli, E., et al., "Dynamically Reconfigurable Devices Used to Implement a Self-Tuning, High Performances PID Controller," 1989 IEEE, pp. 107-112.

Bursky, D., "Fine-Grain FPGA Architecture Uses Four Levels of Configuration Hierarchy," 2328 Electronic Design, 41, No. 20, Cleveland, OH, Oct. 1, 1993, pp. 33-34.

Cliff, et al., "A Dual Granularity and Globally Interconnected Architecture for a Programmable Logic Device", IEEE '93 pp. 7.3.1-7.3.5.

Devades, S., et al., "Boolean Decomposition of Programmable Logic Arrays," IEEE 1988, pp. 2.5.1-2.5.5.

F. Zlotnick, P. Butler, W. Li, D. Tang, "A High Performance Fine-Grained Approach to SRAM Based FPGAs", p. 321-326, Wescon Sep. 28-30, 1993.

Liu, D.L., et al., "Design of Large Embedded CMOS PLA's for Built-In-Self-test," IEEE Transactions on Computed-Aided Design, vol. 7, No. 1, Jan. 1988, pp. 50-53.

Minnick, R.C., "A Survey of Microcellular Research", vol. 14, No. 2, Apr. 1967, pp. 203-241.

Motorola Project Brief, "MPA10xx Field Programmable Gate Arrays," Sep. 27, 1993, 2 pages.

Robert H. Krambeck, "ORCA: A High Performance, Easy to Use SRAM Based Architecture", p. 310-320, Wescon Sep. 28-30, 1993.

Shoup, R. G., "Programmable Cellular Logic Arrays," Abstract, Ph.D. Dissertation, Carnegie Mellon University, Pittsburgh, PA, Mar. 1970, (partial) pp. ii-121.

Spandorfer, L.M., "Synthesis of Logic Functions on an Array of Integrated Circuits", Contract No. AF 19 (628) 2907, Project No. 4645, Task No. 464504, Final Report, Nov. 30, 1965.

Sun, Y., et al., "An Area Minimizer for Floorplans with L-Shaped Regions," 1992 International Conference on Computer Design, 1992 IEEE, pp. 383-386.

Vidal, J. J., "Implementing Neural Nets with Programmable Logic," IEEE Transactions on Acoustic, Speech, and Signal Processing, vol. 36, No. 7, Jul. 1988, pp. 1180-1190.

Wang, P. et al. IEEE, "A High Performance FPGA with Hierarchical Interconnection Structure", pp. 239-242 (May 30, 1994).

Xilinx, "The Programmable Gate Array Data Book", 1992.

PCT International Search Report and Written Opinion of the International Searching Authority, International Application No. PCT/US05/20945, International filing date Jun. 15, 2005, mailed Jul. 19, 2006.

* cited by examiner

INTERCONNECTION FABRIC USING SWITCHING NETWORKS IN HIERARCHY

TECHNICAL FIELD

Embodiments of this invention relate to an interconnection fabric using switching networks interconnected in hierarchy and, in particular, to application of using the interconnection fabric to interconnect programmable logic circuits.

BACKGROUND

A switching network is comprised of ports, pins, conductors and switches. The ports and pins are external constructs of the switching network where each port contains a plurality of pins to interface to other switching networks or circuits. The conductors and switches are internal constructs of the switching network configured to transfer data or signals from pins of a first plurality of ports of a first type to pins of a second plurality of ports of a second type inside the switching network. The pins of the first plurality of ports receive data or signals and transmit those data or signals through the conductors and the switches of the switching network to the pins of the second plurality of ports. The pins of the ports of the switching network are physically connected to respective conductors of the switching network. The switches of the switching network are program controlled to enable connection paths among the pins of the first plurality of ports to the pins of the second plurality of ports. The connection paths connecting two pins inside the switching network can sometimes involve one or more intermediate conductors coupled through switches of the switching network. Thus the pins and ports of the switching network are external constructs where the pins of ports of the first type receives data or signals from sources such as other switching networks and circuits and the pins of ports of the second type transmit signals or data to destinations such as other switching networks and circuits. The switches and conductors of the switching network are internal constructs where the data or signals on the pins of ports of the first types are transmitted to the pins of ports of the second type through the switches and conductors of the switching network.

Generally, the transmission of data or signals from the first plurality of ports to the second plurality of ports through the switching network is substantially simultaneous and non-blocking. In the case where data or signals of a single pin of a port of the first plurality of ports are transmitted to multiple pins of respective multiple ports of the second plurality of ports, this is called multicasting in network connection terms. The switching network can also be used as programmable interconnect circuitry for programmable logic circuits. In the case of programmable logic circuits, the multicasting corresponds to a source (output) connecting to multiple inputs. Each of the pins of the switching network connects to a conductor internally inside the switching network. For ease of illustration and consistency with the conventional way to describe such technologies, we shall denote each switching network under discussion as having a first set of M conductors (having m number of conductors, for example) to correspond to the pins of the first plurality of ports of the switching network. We denote the second plurality of ports as having k ports where each of the k ports has ni pins with i=[1-k] where each ni is at most equal to n. Additionally, we denote a k plurality of conductors where each of the k plurality of conductors having Ni[1-ni] conductors for i=[1-k]. Thus the switching network can be used to connect the pins of the first plurality of ports to the pins of the k ports through use and control of switches and conductors. Each of the pins of the first plurality of ports is capable of connecting to at least one pin to each of the k ports through the switching network. Typically, multiple numbers of pins of the first plurality of ports can independently connect to the pins of the k ports using the switching network without blocking.

A well-known switching network is the full matrix switch. FIG. 1 illustrates a prior art embodiment of a full matrix switching network 10 with one port 110 having m number of pins which are connected to the m number of M conductors M[1-m] 11 inside the switching network 10. The conductors 111-114 of 11 are in term coupled to the pins of each of the k ports 12-14 through the switches 15 and the Ni[1-ni] conductors 120-140 of the network 10 for i=[1-k]. Each of the k ports 12-14 has ni pins with i=[1-k] (e.g. port 12 has n1 pins, port 13 has n2 pins, port 14 has nk pins). Total number of switches in the full matrix switching network 10 is m×sum$_{i=[1-k]}$ni switches; as an example, for m=28, each ni=4 and k=9, the number of switches is 1,008. Any subset of the M conductors 11 in FIG. 1 can connect to a pin in each of the k ports 12-14 through the switches 15 of the full matrix switching network without blocking.

FIG. 2 illustrates a prior art embodiment of a 1-SN switching network 20 by Pani et. al. (U.S. patent application Ser. No. 10/814,943, filed Mar. 30, 2004) with port 221 having m=28 pins and the same M conductors M[1-m] 21 connecting to the pins of port 221. Each of the k ports 222-230 have four pins which are connected to the respective Ni[1-4] conductors 22-30 of the switching network 20 where k=9, with each Ni=4 for i=[1-k], in FIG. 2. The number of switches in 31 of FIG. 2 is 28×(4+9)=364. 31 of FIG. 2 represent the switches connecting between the intersecting conductors (32 to 22-30). Similarly, as in the full matrix of FIG. 1, the 1-SN of FIG. 2 can connect any subset of the m pins of port 221 through connection to the respective M conductors 21 to a pin in each of the k ports 22-30 through the switches 31 an the intermediate conductors 32 and the Ni[1-ni] conductors 222-230 of the 1-SN; 32 are intermediate conductors which serve to connect the M conductors 21 to the k ports of n pins 222-230 through 22-30 using switches 31 of the 1-SN 20.

The difference between the full matrix switch of FIG. 1 and the 1-SN of FIG. 2 inside the respective network is that each M conductor 21 connects to the conductors of the k plurality of conductors 22-30 through one of the intermediate I[1-28] conductors 32 while there is no intermediate conductor in the full matrix switch. The number of switches required in the full matrix switch and the 1-SN is M×k×n and at most M×(k+n), respectively. The number of switches in the prior art switching network of FIG. 1 can be significantly larger than that of FIG. 2 when the size of M, ni and k becomes large. As an example, for M=256, ni=16, and k=18, the full matrix switching network of FIG. 1 would have 256×(16×18)=73,728 switches while a 1-SN switching network of FIG. 2 would be 256×(16+18)=8,704 switches and one 2-SN switching network embodiment of prior art by Pani et. al. (U.S. patent application Ser. No. 10/814,943, filed Mar. 30, 2004) would be 256×(4+4+18)=6,656 switches.

When the size of a switching or interconnect network becomes real large (i.e. the M conductors and the Ni[1-n] conductors of the k plurality of conductors are in the thousands or more), the number of switches required to effect interconnect from M conductors to the Ni[1-n] conductors in either FIG. 1 or FIG. 2 scheme will become impractical. Instead, a hierarchical scheme can be used to interconnect switching networks to effect large number of M conductors to the Ni[1-n] conductors. It is worth noting that, it makes sense to describe connection inside the switching network as connecting the M conductors to the k plurality of conductors Ni[1–ni] for i=[1–k] while viewed externally, the connections are from the pins of the first plurality of ports (in FIG. 1 and FIG. 2, there is one such port, 110 and 221, respectively) to the pins of the k ports (which are the second plurality of ports).

Another type of switching network is the Clos network described by L. M. Spandorfer in 1965 where any pin of the N nodes is connectable to any other pin of the N nodes through the Clos network independently without blocking. Reblewski et. al. in U.S. Pat. No. 6,594,810 described a scalable architecture using crossbars for a reconfigurable integrated circuit. Wong in U.S. Pat. No. 6,693,456 described an architecture using Benes networks for field programmable gate array. A switching network (SN) was disclosed by the present inventors in U.S. patent application Ser. No. 10/814,943, filed Mar. 30, 2004. In one embodiment of the SN, the M conductors are connected to the k plurality of conductors in the SN through at least one intermediate stage of interconnection, in addition to switches in the SN; any conductor of the M conductors can connect to a Ni[1–n] conductor in each of the k ports independently in the SN.

When the number of the M conductors and the k plurality of conductors are large, it becomes impractical to use one large switching network to make all the programmable interconnections; instead, hierarchy of switching networks are generally used to reduce the total number of switches required in the resulting interconnect system. Additionally, hierarchy is used to take into account the varying amount of traffic amongst large number of traffic origination and termination nodes throughout different locations in the overall network. Using telephone network as an example, local residential and business traffic in a small geographic location are bundled into a central office so the central offices serve as the lowest level of switching networks. The voice and data traffic from the central offices are in turn bundled into regional offices which serve as the next higher level of switching networks and the regional offices are then interconnected to yet higher level of switching networks. Each of the different levels of switching networks has varying size and capacity to handle data and voice traffic in the overall network. One of the common problems to be solved in a hierarchical switching networks is thus to size the overall hierarchy of switching networks to handle the varying amounts of local, intermediate, and higher levels of data and signals transmitted and received by the different switching networks and limit the total number of switches required to allow effective connections for very large number of M conductors to large number of k plurality of conductors while substantially preserving the non-blocking property of the interconnection fabric.

BRIEF DESCRIPTION OF THE DRAWINGS

The objectives, features, and advantages of embodiments of the present invention will be apparent from the following detailed description in which.

DETAILED DESCRIPTION

An innovative hierarchical scheme of interconnecting switching networks to provide a large interconnection fabric is described. The hierarchical switching networks can be applied in a wide range of applications, when used, to provide a large interconnection fabric used in switching, routers, and programmable logic circuits. Relative comparisons are provided contrasting the interconnection fabric using hierarchical switching networks with full matrix switches and with the SN of the prior art by the present inventors in U.S. patent application Ser. No. 10/814,943, filed Mar. 30, 2004.

In the following description, for purposes of explanation, numerous specific details are set forth in order to provide a thorough understanding of embodiments of the present invention. It will be apparent to one skilled in the art that embodiments of the present invention may be practiced without these specific details. In other instances, well-known structures and circuits are shown in block diagram form in order to avoid unnecessarily obscuring embodiments of the present invention. For purpose of description, unless otherwise specified, the terms program controlled switch and switch are interchangeable in the context of this description. The term port comprises a plurality of pins where each of the pin is physically connected to a conductor of the switching network in this disclosure. The terms program configured logic cell, logic cell, cell, Look Up Table (LUT), programmable logic cell are interchangeable in the context of this description. Furthermore, the term "to connect" as used in the current description may include both to directly connect and to indirectly connect (for example, inserting a driver or repeater to boost signal strength). Likewise, the term "to couple" as used herein may include both to directly couple and to indirectly couple. It should also be noted that some embodiments of the present invention use program control means to set the states of switches utilized, this control means can be one time, such as fuse/anti-fuse technologies, or re-programmable, such as SRAM (which is volatile), FLASH (which is non-volatile), Ferro-electric (which is non-volatile), etc. Hence, embodiments of the present invention pertain to a variety of processes, including, but not limited to, static random access memory (SRAM), dynamic random access memory (DRAM), fuse/anti-fuse, erasable programmable read-only memory (EPROM), electrically erasable programmable read-only memory (EEPROM) such as FLASH, and Ferro-electric processes.

When a program controlled switch is used to interconnect one pin or a conductor to another pin or another conductor, a driver or repeater circuit may be coupled to the switch to improve the speed of the signal traversing those pins and/or conductors.

Figure 3:
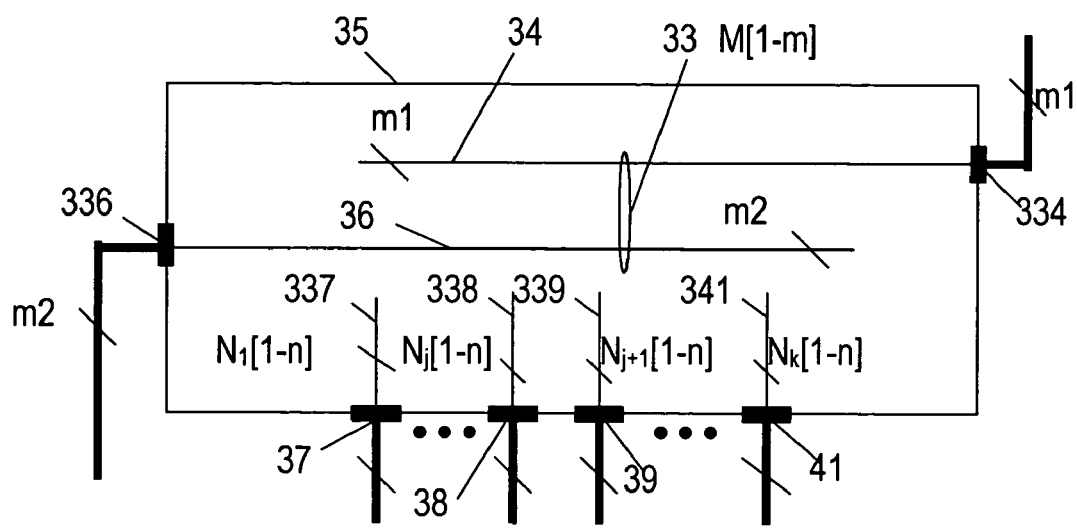
FIG. 3 illustrates one embodiment of a switching network with first type ports having two ports of m1 pins and a m2 pins, respectively; corresponding m1 and m2 number of M conductors, second type of ports with k ports where each port having Ni[1–n] pins for i=[1–k].

FIG. 3 illustrates one embodiment of a generalized representation of a switching network 35 where the first plurality of ports 334 and 336 with m1 and m2 number of pins in the respective ports; the k ports (or the second plurality of ports) 37-41 have n pins in each of those k ports. In side the switching network 35 of FIG. 3, there are m number of M conductors 33, k plurality of Ni[1–n] conductors 337-341 (while the size of each of the Ni conductors need not to be the same, for ease of illustration, we shall assume each Ni's is of the same size n here) where 33 are connecting to the k plurality of conductors 337-341. The first plurality of ports 334 and 336 of FIG. 3 can be considered as a first type of ports having at least two ports, when used in the hierarchy, the first port 334 has m1 number of pins and the second port 336 has m2 number of pins. The first port 334 can be considered as an ancestral port where the m1 pins of 334 are connected to an ancestral or a higher level switching network in the hierarchy as part of the interconnection fabric. The second port 336 can be considered as a descendant port where the m2 pins of port 336 are connected to a descendent or a lower level switching network in the hierarchy as part of the interconnection fabric. Inside the network 35, there is at least m number of M conductors 33 which has at least two parts: 34 having m1 number of M conductors and 36 having m2 number of M conductors which are connected to the pins of ports 334 and 336, respectively. The M conductors in 34 and 36 are treated substantially equally within the switching network 35. The different labeling is indicative of the use of those M conductors in 34 and 36 in the context of switching network hierarchy, which shall become clear in the following description. The k ports 37-41 can be considered as part of a second type of ports which are separated into two subgroups, when used in the hierarchy context: the first subgroups has j ports 37-38 with j×n pins where j is equal to or greater than zero; the second subgroup has (k-j) ports 39-41 with (k-j)×n pins. Similarly, the pins of the k ports of the two subgroups 37-38, 39-41 (and correspondingly the Ni[1–n] conductors k plurality of conductors 337-341) are treated substantially equally within the switching network; they are labeled to illustrate the use of those pins in the ports in the hierarchy context. The number of pins in each of the k ports need not be uniform; the n number of pins in each of the k ports 37-41 of FIG. 3 is the maximum number of the k ports if it is not uniform.

Figure 4:
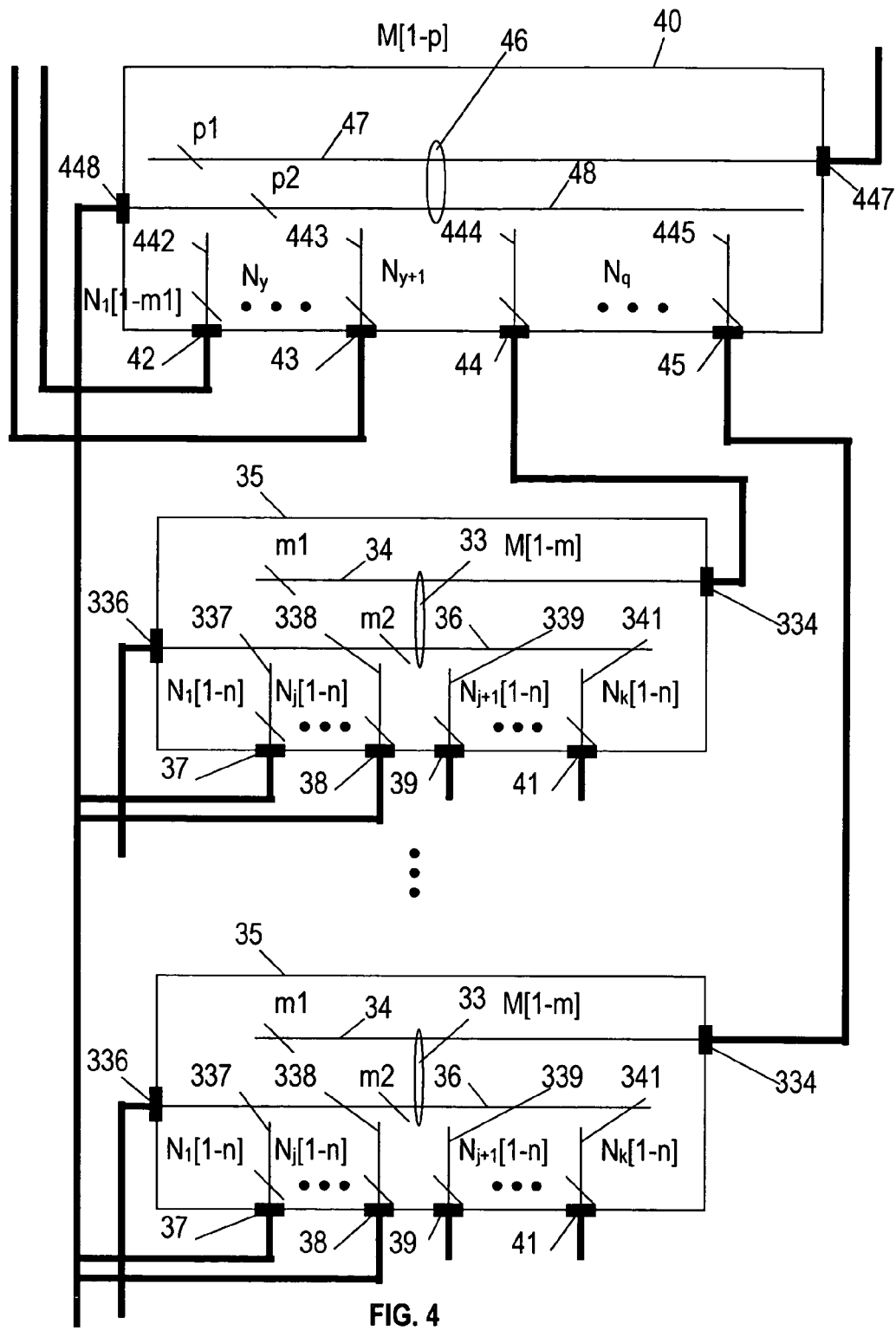
FIG. 4 illustrates one embodiment of an interconnect scheme of at least two levels of hierarchy comprising switching networks and logic function blocks interfacing to each other.

FIG. 4 illustrates one embodiment of an interconnect scheme having at least two levels using switching networks. The switching networks represented by 35 of FIG. 4, each with m number of M conductors 33, are the lower level of switching networks in the at least two-levels of hierarchy. The first plurality of ports of the switching network 40 has at least two ports, with the first port 447 and the second port 448 having p1 and p2 number of pins respectively. There are p number of M conductors 46 which has two parts, 47 and 48 having p1 and p2 number of M conductors respectively. Additionally, the second plurality of ports of the switching network 40 has q ports 42-45 having m1 pins in each of the q ports; correspondingly, the switching network 40 has Ni[1–m1] with m1 number of conductors in each of the q plurality of conductors 442-445.

Switching network 40 is the higher level switching network of the at least two-levels of hierarchy. Specifically, in the FIG. 4 embodiment, the n pins of each of the 37-38 ports of each switching network 35 are connected to the pins of port 448 of the higher level switching network 40. Additionally, the m1 number of pins of port 334 of each of the switching networks 35 are connected to the port pins 44-45 of the switching network 40. It is convenient, though not necessary, to visualize the above outlined connection scheme of FIG. 4 in terms of signals or data transmitted and received in order to better understand the architecture: ports 37-38 of each 35 can be considered as the source of data transmission which are part of port 448 of switching network 40, where, by program selection through the switching network 40, the data can be received by the pins in any of the q ports 42-45 of 40. Data on port 448 (from lower levels of switching networks) can be transmitted to the lower levels (thus providing inter switching networks data transmission for switching networks at the same or lower levels such as 35) through ports 44-45 (which are the port 334 of switching network 35 which receives data from higher levels of switching networks such as 40) to each of the n pins of the k ports 37-41 of the switching networks 35.

From a data or signals traffic point of view, the embodiment outlined in FIG. 4 can be viewed as a hierarchy of switching networks to handle suitable amount of traffic in a given region. Each of switching network 35 can be considered as a local or regional node to handle communication traffic within a region and across both larger and smaller regions. The data or signals from the switching network 40 through port 44 to port 334 of the switching network 35 can be considered as the traffic from a larger region (serviced by the switching network 40) to the local region serviced by the switching network 35. The data or signals from 37-38 of 35 can be considered as traffic from region serviced by the switching network 35 to go to a yet wider region serviced by the switching network 40 and beyond. Similarly, the traffic from the port 336 are the data or signals from lower levels (smaller regions) to the switching network 35 and the traffic from the ports 39-41 are from the regions serviced by the switching network 35 (which can originate from larger regions serviced by the switching network 40, for example) to smaller regions serviced by lower levels of switching networks. The sizes of the communication links, among different switching networks: n, m1, etc., are functions of the desired capacity based on the anticipated amount of data or signals to be handled by the respective switching networks.

The scheme just outlined above can be extended down to yet lower levels of switching networks where each of the n pins of the (k-j) ports 39-41 of each 35 are connected to the pins of a first plurality of ports from a yet lower level switching network much like the port 44 of 40 are connected to the port 334 of 35 illustrated in FIG. 4. Similarly, the m1 pins of the y ports 42-43 of 40 in FIG. 4 are connected to the pins of a first plurality of ports of a higher level of switching network while the p1 pins of port 447 are connected to a respective p1 number of pins of one of the second plurality of ports of the higher level switching network. If necessary, driver or repeater circuits can be provided to ensure signal strength during data transmission throughout the switching network hierarchy at the appropriate ports.

An alternative embodiment of FIG. 4, while may increase the number of pins of the first plurality of ports of the higher levels of switching networks, can provide better speed in data transmission. As an example, to transmit data from port 37 to a higher level switching network above 40, the embodiment of FIG. 4 would require port 37 to connect to the pins of one of the ports 42-43 of 40, through port 448 and switching network 40, which in turn is connected to the first plurality of ports of the higher level switching network. The alternative embodiment allows ports 37-38 to connect, in addition to or in place of being connected to port 448, to the first plurality of ports of the higher level switching network. In this alternative embodiment, data from port 37-38 can be directly accessed from the first plurality of ports of the higher level switching network.

Figure 1:
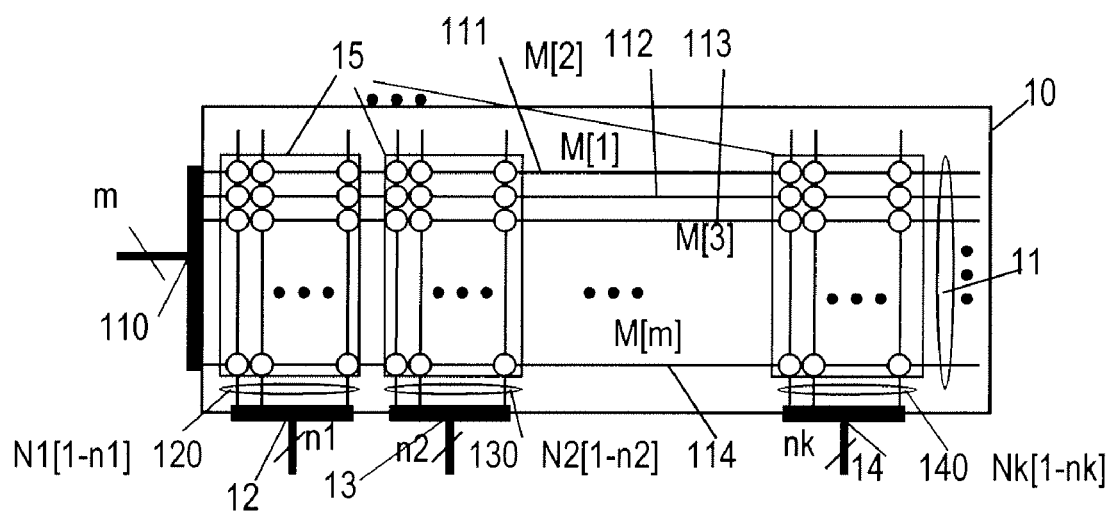
FIG. 1 illustrates one embodiment of a prior art full matrix switching network.
Figure 2:
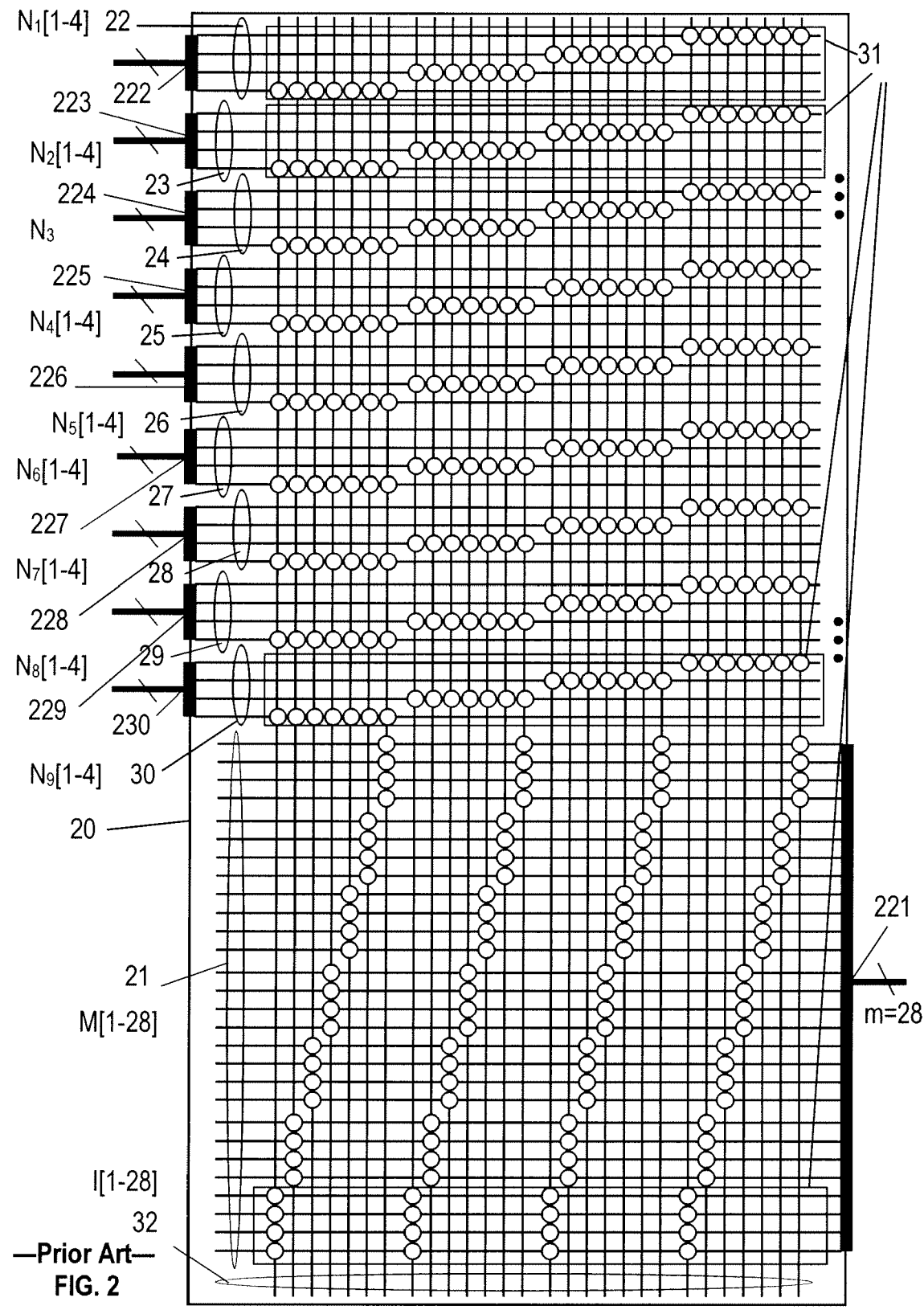
FIG. 2 illustrates one embodiment of a prior art stage-1 scalable non-blocking switching network (1-SN).

Using switching networks hierarchically can effectively reduce the total switch requirement compared with a one level switching network while allows for flexible interconnection. For example, if each of the switching network 35 of FIG. 4 has m=256, k=18, and n=16 with nine switching networks 35 while the switching network 40 has p=1,280, q=9 and the number of pins for each q port is m1=96 for 442-445, the resultant switching network can used to connect p=1,280 pins to 162 ports of 16 pins, or a total of 2,592 pins. In contrast, using the full matrix switching network described in FIG. 1 for the hierarchy of switching networks described in FIG. 4 would require 73,728 switches for each of the switching network 35 and 1,105,920 switches for the switching network 40 where there are nine copies of the switching network 35 making the total number of switches to be 1,769,472 for the hierarchical switching networks of FIG. 4. Alternatively, if the full matrix is implemented flat with p=1,280 and 162 ports with 16 pins each, the resulting switching network would have 3,317,760 switches. Using the 1-SN switching network described in FIG. 2 for the hierarchy of switching networks described in FIG. 4 would require 8,704 switches for each of the switching network 35 and 134,400 switches for the switching network 40 where there are nine copies of the switching network 35 making the total number of switches to be 212,736 for the hierarchical switching networks of FIG. 4. Alternatively, if the 1-SN is implemented flat with p=1,280 and 162 ports with 16 pins each, the resulting switching network would have 227,840 switches. A 2-SN implementation of the switching network disclosed by Pani et. al. in the U.S. patent application Ser. No. 10/814,943, filed Mar. 30, 2004, uses only 97,024 switches for implementing a switching network substantially the same as the one shown in FIG. 4 while a flat implementation uses 217,600 switches.

The switching network 40 of FIG. 4 can act similarly as the switching network 35 to interface to a higher level switching network so port 447 (with p1 number of pins) is connected to one of the second plurality of ports (having p1 number of pins) in the higher level switching network and the pins of the y ports 42-43 are connected to a first plurality of ports of the higher level switching network in the manner described in FIG. 4. Similarly, the switching network 35 of FIG. 4 can act as a higher level switching network connecting to multiple lower level switching networks.

The technique disclosed above is not limited to coupling switching networks to each other. In some embodiments, the technique can be applied to couple a logic function block to at least one port of at least one switching network. A logic function block can be as simple as a logic gate with multiple inputs and at least one output. The logic gate may be a custom crafted logic gate or a programmable logic gate. Examples of more complex logic function blocks include a multiplier accumulator (MAC), a Digital Signal Processing (DSP) processor, a microprocessor, etc. A memory block such as a single or a dual port SRAM memory with inputs and outputs can be considered as a special type of logic function block in the discussion of this disclosure. An example is illustrated in FIG. 5.

Figure 5:
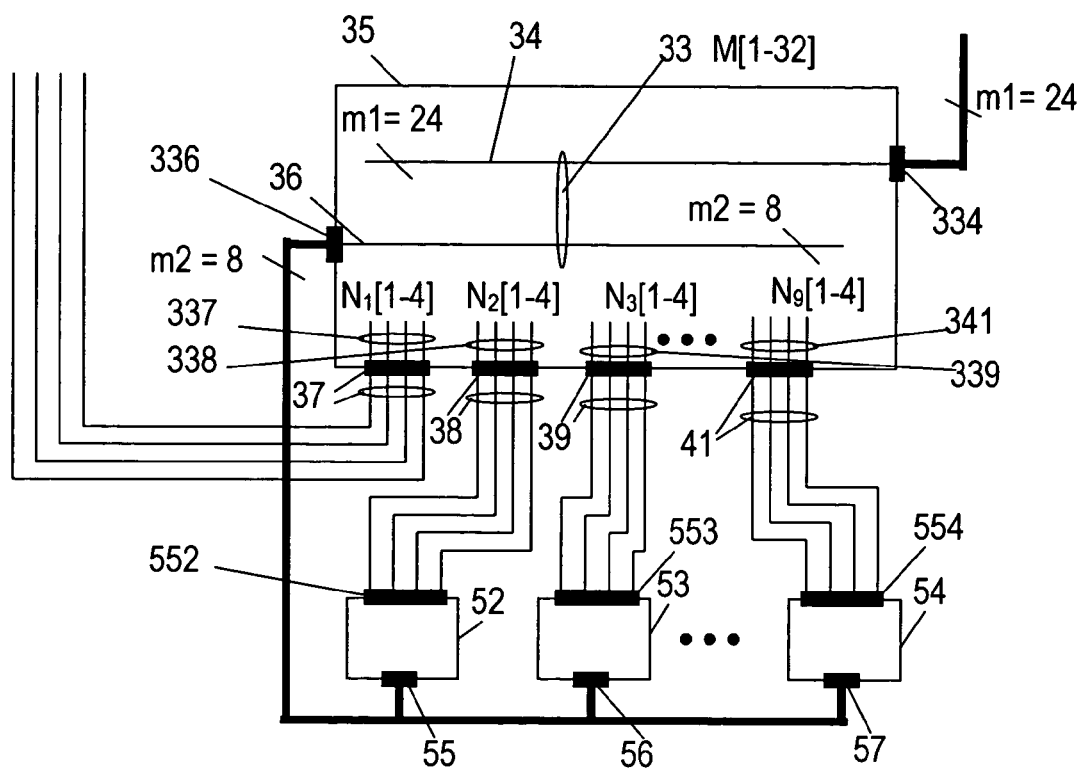
FIG. 5 illustrates one embodiment of an interconnect scheme connecting a switching network to multiple logic function blocks.

FIG. 5 illustrates one embodiment of a switching network 35 with M conductors 33 where m=32, and k=9 ports, the number of pins in each of the k ports 37-41 is n=4 and correspondingly, the number of conductors in each of k plurality of conductors 337-341 is four. In the scheme of FIG. 5, the pins of the eight ports 38-41 are connected to the pins of eight ports 552-554 of eight respective logic function blocks 52-54. Each of the logic function blocks 52-54 can be considered as a particular switching network where each of the eight ports 552-554 has number of pins equal to the number of pins in each of the ports 38-41, respectively, which is four. For example, in the embodiment of FIG. 5, the number of ports in both the first plurality of ports and the second plurality of ports for each of the logic function blocks 55-57 is one and the number of pins in the first plurality and the second plurality of ports is four and 1 respectively. The pins 55-57 of the respective logic function blocks 52-54 are connected to the pins of port 336 and in this case, the number of pins is m2=8. The four pins of port 37 are connected to the pins of a first plurality of ports of a higher level switching network (such as port 448 of FIG. 4). For example, each of logic function blocks 52-54 can be a four input, one output programmable logic cell such as a four input Look Up Table (LUT) logic cell which is a logic function block with four inputs and one output. Hence the scheme of constructing hierarchical switching networks described herein can be used in interconnecting programmable logic circuits in addition to switching networks.

Thus we have described an interconnection fabric using switching networks in a hierarchy. The foregoing discussion merely describes some exemplary embodiments of the present invention. One skilled in the art will readily recognize from such discussion, the accompanying drawings, and the claims that various modifications can be made without departing from the spirit and scope of the appended claims. The description is thus to be regarded as illustrative instead of limiting.

What is claimed is:

1. An interconnection fabric, comprising a first switching network, wherein the first switching network comprises:
   a first plurality of ports of a first type, the first plurality of ports comprising a first port having m1 number of pins physically connected to respective m1 number of conductors and a second port having m2 number of pins physically connected to respective m2 number of conductors;
   a second plurality of ports of a second type, the second plurality of ports comprising at least k ports, wherein each of the k ports has at most n number of pins physically connected to respective at most n number of conductors;
   a first plurality of conductors; and
   a first plurality of switches;
   wherein each conductor of the first plurality of conductors is to selectively couple to a pin of any of the ports of the first switching network through at least one switch of the first plurality of switches,
   each pin of the first type of ports of the first switching network is to selectively couple to a respective pin in each port of the second type of ports of the first switching network through a respective conductor of the first plurality of conductors and at least two switches of the first plurality of switches; and
   the m1 pins of the first port are connected to a plurality of pins of a port of a second plurality of ports of a different switching network and the second port comprises pins which are connected to pins of a plurality of the second plurality of ports of a respective plurality of at least one of a plurality of different switching networks or a plurality of logic function blocks.

2. An interconnection fabric, comprising a first switching network, wherein the first switching network comprises:
   a first plurality of ports of a first type, the first plurality of ports comprising a first port having m1 number of pins physically connected to respective m1 number of conductors and a second port having m2 number of pins physically connected to respective m2 number of conductors;
   a second plurality of ports of a second type, the second plurality of ports comprising at least k ports, wherein each of the k ports has at most n number of pins physically connected to respective at most n number of conductors;
   a first plurality of conductors;
   a first plurality of switches,
   wherein each conductor of the first plurality of conductors is to selectively couple to a pin of any of the ports of the first switching network through at least one switch of the first plurality of switches, each pin of the first type of ports of the first switching network is to selectively couple to a respective pin in each port of the second type of ports of the first switching network through a respective conductor of the first plurality of conductors and at least two switches of the first plurality of switches, and the m1 pins of the first port are coupled to a plurality of pins of a port of a different switching network and the second port comprises pins which are coupled to pins of a plurality of ports of a respective plurality of at least one of a plurality of different switching networks and a plurality of logic function blocks; and a second switching network, wherein the second switching network comprises:
   a third plurality of ports of the first type, the third plurality of ports comprising a third port having p1 number of pins physically connected to respective p1 number of conductors and a fourth port having p2 number of pins physically connected to respective p2 number of conductors;
   a fourth plurality of ports of the second type, the fourth plurality of ports comprising at least q ports, wherein each of the q ports has at most x number of pins physically connected to respective x number of conductors; and
   a second plurality of switches;
wherein each pin of the third plurality of ports of the second switching network is to selectively couple to a respective pin in each port of the fourth plurality of ports of the second switching network through the physically connected conductor of the respective pin and the second plurality of switches; and the fourth port comprises at least the pins which are coupled to the at most n pins of at least one port of the k ports.

3. The interconnection fabric of claim 2, wherein each conductor physically connected to a pin of the at most n pins of at least one port of the k ports is to selectively couple to each conductor physically connected to a pin of any of the ports of the second type of the first switching network and the second switching network.

4. The interconnection fabric of claim 2, wherein the m1 number of pins of the first port are coupled to the at most x number of pins of one of the q ports.

5. The interconnection fabric of claim 4, wherein the at most n pins of each port of the k ports are coupled to the pins of a port of a respective plurality of descendant switching networks.

6. The interconnection fabric of claim 4, further comprises of (k-j) number of programmable logic cells, where j is at least equal to one, wherein each of the programmable logic cells has n input pins and one output pin; and each n input pins of the programmable logic cells are coupled to the at most n pins of the one of the (k-j) ports of the first plurality of k ports.

7. The interconnection fabric of claim 6, wherein the output pins of the (k-j) programmable logic cells are coupled to part of the m2 number of pins of the fourth port.

8. The interconnection fabric of claim 7, wherein the interconnection fabric is implemented in an integrated circuit device.

9. The interconnection fabric of claim 2, further comprising a third switching network comprises:
   a first type of ports comprising a fifth port having r1 number of pins physically connected to respective r1 number of conductors and a sixth port having r2 number of pins physically connected to respective r2 number of conductors;
   a second type of ports comprising a third plurality of s ports, wherein each of the s ports has at most m1 number of pins physically connected to respective at most m1 number of conductors; and
   a third plurality of switches;
wherein each pin of the first type of ports of the third switching network is to selectively couple to a respective pin in each port of the second type of ports of the third switching network through the respective physically connected conductors and the third plurality of switches, and the m1 number of pins of the first port are coupled to the at most m1 number of pins of one of the third plurality of s ports.

10. The interconnection fabric of claim 9, wherein the r1 number of pins of the fifth port are coupled to the at most x number of pins of one of the second plurality of q ports.

11. The interconnection fabric of claim 10, wherein the interconnection fabric is implemented in an integrated circuit device.

12. A method to provide connectivity in an interconnection fabric comprising a first switching network, the first switching network comprising a first plurality of ports of a first type, the first plurality of ports comprising a first port having m1 number of pins physically connected to respective m1 number of conductors and a second port having m2 number of pins physically connected to respective m2 number of conductors, a second plurality of ports of a second type, the second plurality of ports comprising k ports, each of the k ports comprising at most n number of pins physically connected to respective at most n number of conductors, a first plurality of conductors, and a first plurality of switches, the method comprising:
   selectively coupling each conductor of the first plurality of conductors to a pin of any of the port of at least one of the first plurality and the second plurality of ports of the first switching network through at least one switch of the first plurality of switches;
   selectively coupling each pin of the first plurality of ports of the first switching network to a respective pin in each of the second plurality of ports of the first switching network through a respective conductor of the first plurality of conductors and at least two switches of the first plurality of switches;
   selectively connecting the m1 pins of the first port to a plurality of pins of a port of a second plurality of ports of a different switching network; and
   selectively coupling the m2 conductors of the second port to a plurality of pins of a plurality of the second plurality of ports, wherein each port of the plurality of ports is of at least one of a different switching network or a logic function block.

13. The method of claim 12, wherein the interconnection fabric further comprises a second switching network, the second switching network comprises:
   a third port of the first type, the third port comprising p1 number of pins physically connected to respective p1 number of conductors;
   a fourth port of the first type, the fourth port comprising p2 number of pins physically connected to respective p2 number of conductors;
   a q number of ports of the second type, each of the q ports comprising at most x number of pins physically connected to respective x number of conductors; and
   a second plurality of switches.

14. A method to provide connectivity in an interconnection fabric comprising a first switching network, the first switching network comprising a first plurality of ports of a first type, the first plurality of ports comprising a first port having m1 number of pins physically connected to respective m1 number of conductors and a second port having m2 number of pins physically connected to respective m2 number of conductors, a second plurality of ports of a second type, the second plurality of ports comprising k ports, each of the k ports comprising at most n number of pins physically connected to respective at most n number of conductors, a first plurality of conductors, and a first plurality of switches, the method comprising:

selectively coupling each conductor of the first plurality of conductors to a pin of any of the port of at least one of the first plurality and the second plurality of ports of the first switching network through at least one switch of the first plurality of switches;

selectively coupling each pin of the first plurality of ports of the first switching network to a respective pin in each of the second plurality of ports of the first switching network through a respective conductor of the first plurality of conductors and at least two switches of the first plurality of switches;

selectively coupling the m1 pins of the first port to a plurality of pins of a port of a different switching network; and selectively coupling the m2 conductors of the second port to a plurality of pins of a plurality of ports, wherein each port of the plurality of ports is of at least one of a different switching network and a logic function block, wherein the interconnection fabric further comprises a second switching network, the second switching network comprises:
- a third port of the first type, the third port comprising p1 number of pins physically connected to respective p1 number of conductors,
- a fourth port of the first type, the fourth port comprising p2 number of pins physically connected to respective p2 number of conductors,
- a q number of ports of the second type, each of the q ports comprising at most x number of pins physically connected to respective x number of conductors, and
- a second plurality of switches;

selectively coupling each pin of the third and fourth ports of the second switching network to a respective pin in each of the q ports of the second switching network through the physically connected conductor of the respective pin and at least one switch of the second plurality of switches; and selectively coupling the p2 pins of the fourth port of the second switching network to the at most n pins of at least one port of the k ports of the first switching network.

15. The method of claim 14, further comprising:
selectively coupling each conductor physically connected to a pin of the at most n pins of at least one port of the k ports to each conductor physically connected to a pin of any of the second plurality of ports of the first switching network and the q ports of the second switching network.

16. The method of claim 14, further comprising:
selectively coupling the m1 number of pins of the first port to the at most x number of pins of one of the q ports.

17. The method of claim 16, further comprising:
selectively coupling the at most n pins of each port of the k ports to a plurality of pins of a port of at least one of a plurality of descendant switching networks.

18. The method of claim 16, wherein the interconnection fabric further comprises (k-j) number of programmable logic cells, where j is an integer equal to or greater than one, each of the (k-j) programmable logic cells comprises n input pins and at least one output pin, wherein each pin of the n input pins and the at least one output pin is physically connected to a respective conductor, the method further comprises:
coupling each of the n input pins of the (k-j) programmable logic cells to the at most n pins of the one of the (k-j) ports of the k ports.

19. The method of claim 18, further comprising:
coupling the at least one output pin of each of the (k-j) programmable logic cells to at least part of the m2 number of pins of the fourth port.

20. The method of claim 19, further comprising:
implementing the interconnection fabric in an integrated circuit device.

21. The method of claim 14, wherein the interconnection fabric further comprises a third switching network, the third switching network comprises:
- a fifth port of the first type, the fifth port comprising r1 number of pins physically connected to respective r1 number of conductors;
- a sixth port of the first type, the sixth port comprising r2 number of pins physically connected to respective r2 number of conductors;
- a third plurality of ports of the second type, the third plurality of ports comprising at least s ports, wherein each of the s ports comprises at most m1 number of pins physically connected to respective at most m1 number of conductors; and
- a third plurality of switches.

22. The method of claim 21, further comprising:
selectively coupling each pin of the fifth and the sixth ports to a respective pin in each port of the third plurality of ports of the third switching network through the respective physically connected conductors and the third plurality of switches; and
selectively coupling the m1 number of pins of the first port to the at most m1 number of pins of the s ports.

23. The method of claim 22, further comprising:
selectively coupling the r1 number of pins of the fifth port to the at most x number of pins of one of the q ports.

24. The method of claim 23, further comprising:
implementing the interconnection fabric in an integrated circuit device.

* * * * *